Aug. 1, 1939.   V. BEECHER   2,167,865
PIPE COUPLING
Filed March 4, 1938   2 Sheets-Sheet 1
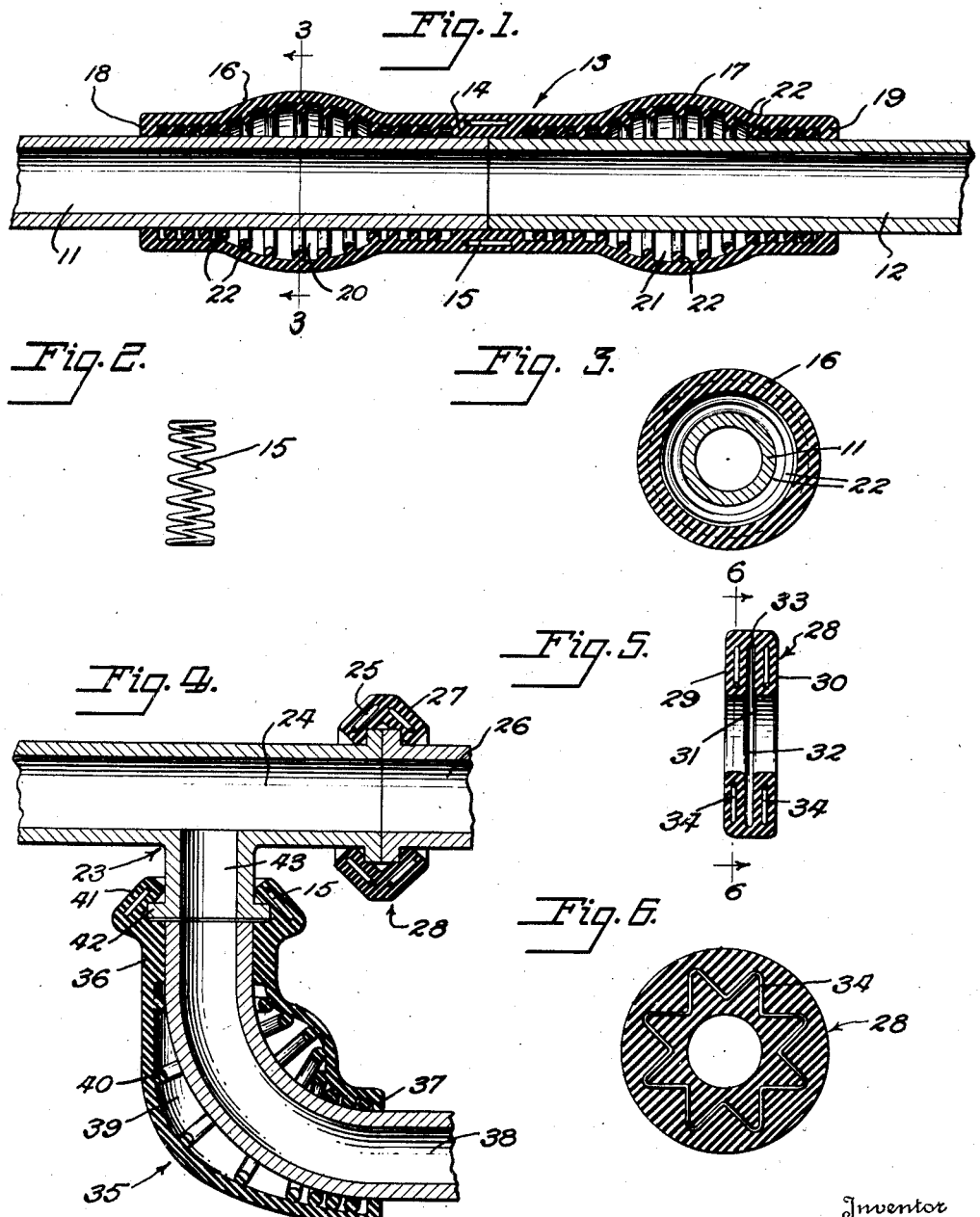
Inventor
Valentine Beecher
By Mason Fenwick & Lawrence
Attorneys

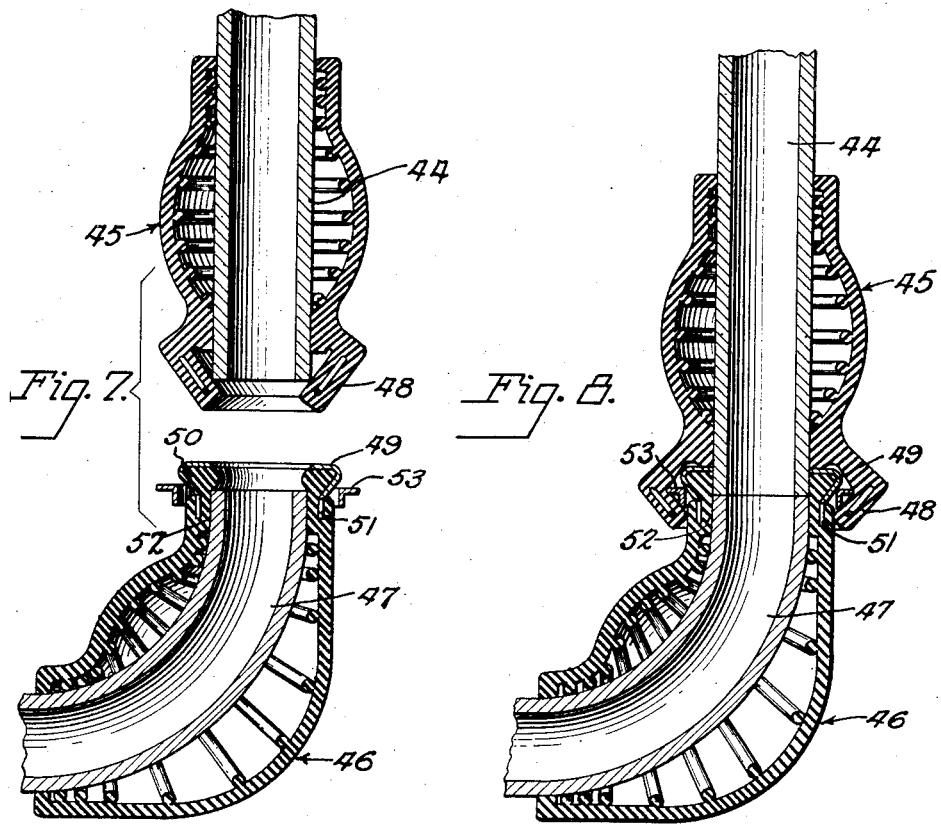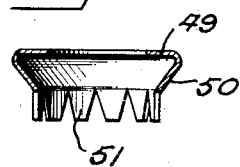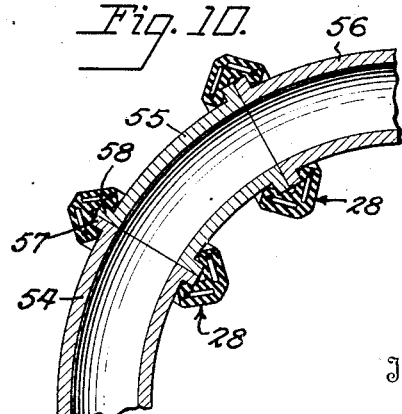

Patented Aug. 1, 1939

2,167,865

UNITED STATES PATENT OFFICE 2,167,865

PIPE COUPLING

Valentine Beecher, Greenville, N. Y.

Application March 4, 1938, Serial No. 193,997

6 Claims. (Cl. 285—90)

This invention relates generally to couplings for pipes or conduits for conveying gases and liquids from one location to another; and more particularly to pipes and couplings adapted to convey liquids, such as beer and other beverages, under low pressure, to be dispensed for public consumption.

In dispensing beer and similar beverages, pressure beyond a certain limit is detrimental to the quality and to the handling and drawing of the beer. Metal commonly used for the piping and couplings in the dispensing of beer frequently sets up chemical action having harmful effects on the flavor and quality of the beer.

It is the main object of the present invention to provide a system of conduits and couplings peculiarly adapted for use in dispensing liquid under low pressures commonly used for the dispensing of beer and similar beverages, whereby the piping may be made of glass or porcelain, or similar material, and which can be very easily cleaned, and the inner walls of which can be glazed or formed smooth enough to avoid projections which normally cause the formation of slime and other objectionable accumulations in the pipes.

Another object of the invention is to provide low pressure conduit systems with flexible couplings which can be applied or removed from the various joints of the pipes and conduits without the aid of tools.

Other objects of the invention will become apparent as the detailed description thereof proceeds:

In the drawings:

Figure 1 is a central, longitudinal section of a pipe coupling constructed in accordance with this invention and illustrated as applied to the meeting ends of two straight sections of pipe;

Figure 2 is an elevation of an annular stiffening spring used as a reinforcement for the aforesaid coupling;

Figure 3 is an transverse section taken on the line 3—3 of Figure 1;

Figure 4 is a section taken through a T-fitting and different forms of flexible couplings adapted to secure contacting ends of piping and elbows together;

Figure 5 is a diametral section through one of the couplings illustrated in Figure 4 and separated from a joint;

Figure 6 is a section taken on the line 6—6 of Figure 5;

Figure 7 is a central section through a union adapted to secure an elbow-fitting to the end of a straight pipe, the parts being shown in this figure as separated from each other;

Figure 8 is a central section illustrating the separated parts of Figure 7 as coupled to each other;

Figure 9 is a transverse section of a reinforcing member forming part of the coupling joint illustrated in Figures 7 and 8; and Figure 10 is a section through a series of curved pipes having flanged-joints and secured together by a flexible coupling of the type illustrated in Figures 4, 5 and 6.

It is intended in all the forms of this invention that the pipes wherever connected together shall form a continuous smooth passageway for the fluids flowing through them. This construction adapts the conduit system to be constructed of glass or porcelain pipes which may be butted end to end and secured together by flexible couplings applied to the pipes without the aid of tools and without necessitating screw-threading of the contacting ends of the connected pipes.

In Figure 1 of the drawings two pipes 11 and 12 are illustrated as held in alignment with their ends in contact with each other by means of a coupling designated generally by the reference numeral 13. This coupling 13, preferably formed of rubber or some composition having similar elastic properties, comprises a central body portion 14 having a diameter slightly less than that of the piping on which the coupling is to be arranged. The central body portion, during the molding of the coupling, has embedded therein a woven spring wire ring 15 to strengthen the coupling and to prevent leakage at the joint between the two pipes 11 and 12.

Integral with the body portion 14 and extending in opposite directions therefrom are the bulb-like extensions 16 and 17 which terminate respectively in inturned annular flanges 18 and 19, the diameters of which are small enough to insure an airtight fit between the flanges and said pipes 11 and 12 when the coupling is assembled thereon.

Between their ends, the extensions 16 and 17 are bulged out to form vacuum chambers 20 and 21, respectively. Each of these chambers has its inner surface provided with a series of annular beads 22, some of which, at each end of the chamber contact with the outer surfaces of the pipes 11 and 12 to increase the frictional contact of the coupling with the pipes. The other beads assist in the gradual return of the extensions to their normal shape and present collapse of these chambers which would be caused by the vacuum resulting from expulsion of air through the ends of the couplings during their assembly on the pipes. It will be obvious that when the operator forces one end of a pipe into either extension, and holds the bulged part of each extension collapsed while the pipe is being forced onto the coupling, the air will be expelled through the ends of the coupling. When pressure on the bulged parts is released, the return of the bulged parts to their normal shape creates a vacuum in the chambers 20 and 21 and thereby enhances the holding and leak preventing properties of the coupling.

In the form of the invention illustrated in Figures 4, 5 and 6, the conduit system comprises a T-fitting 23 having one end of the T-head 24 provided with an outwardly turned flange 25. The flanged end 25 of the head 24 is adapted to form a seat for similarly flanged end of a pipe 26. The flange 27 on the outer end of the pipe 26 is adapted to be held in contact with the flange 25 by means of the flexible coupling designated generally by the reference numeral 28. This coupling 28 is preferably formed of rubber or material having similar properties, and is molded substatnially as shown in Figure 5 of the drawings. In its normal position before being applied, the coupling 28 comprises a ring having parallel outer surfaces 29 and 30 and parallel inner surfaces 31 and 32 separated to form a groove 33. In effect, this coupling 28 comprises a pair of annular disks joined together at their outer peripheries by a body of rubber. A star-shaped insert 34 of woven spring wire is embedded in the disk like parts in this coupling 28 to increase the strength of the coupling and hold the said coupling securely in operative position as shown in Figure 4 of the drawings, snapped over the flanged ends of the T-head 24 and pipe 26 to complete the joint between these two parts.

The elbow coupling designated generally by the reference numeral 35 in Figure 4 of the drawings includes a modification of one-half of the straight coupling, shown in Figure 1 combined with half of the disk coupling illustrated in Figure 5. This elbow coupling comprises a cylindrical portion 36 slightly smaller in diameter than the end of the elbow to which it is to be applied. The other end of the elbow coupling 35 is provided with an inturned annular flange 37 serving the same purpose on the elbow pipe 38 as the flanges 18 and 19 do on the pipes 11 and 12. The part of the coupling 35 between the portion 36 and flange 37 is given an outwardly bulged shape in addition to the elbow curvature to form a vacuum chamber 39, the inner surface of which is provided with a series of bead like ribs or ridges 40 to facilitate the return of the chamber to normal position after having been applied to an elbow.

Obviously, during the insertion of the elbow 38 into the coupling 35, the chamber 39 will be compressed by the hand of the operator. When the insertion is completed and the hand of the operator removed from the elbow coupling, the return of the chamber 39 to its normal position will create a vacuum and draw the cylindrical portion 36 and inturned flange 37 tightly onto the opposite ends of the elbow. The disk-like flange 41 extending inwardly from the cylindrical portion 36, in its normal position should be substantially at right angles to the axis of the cylindrical portion 36. When this flange 41 is snapped over the flange 42 on the end of the leg 43 of the T-fitting 23, it will assume the inclined position illustrated in Figure 4 of the drawings to hold the elbow and T-fitting properly secured to each other. Figures 7, 8 and 9 illustrate cooperating coupling members forming a union designed to connect an elbow to a comparatively long, straight pipe. The form of the invention illustrated in Figure 4 is adapted for use where the leg 43 of the T-fitting is too short to receive a separate coupling. However, when this leg 43 is long enough, a coupling member 45 may be arranged thereon to cooperate with an elbow coupling member 46 in securing the pipe 44 to an elbow section of pipe 47.

The bulged parts of the members 45 and 46 are substantially the same in construction and perform the same function as the bulged part of the straight coupling shown in Figure 1 and the elbow part shown in Figure 4, and therefore, need no further description. The joint end of the member 45 comprises a flange 48 constructed similarly to one of the disk-like parts of the coupling shown in Figure 5. This flange 48, however, is inclined to form a frusto-conical member adapted to snap over a frusto-conical metal washer 49 having an inclined periphery 50 terminating in a series of prongs 51 embedded in the cylindrical end 52 at the upper end of the elbow coupling 46.

An annular collar 53, L-shaped in radial cross section, is interposed between the inner surface of the inclined flange 48 and the outer surface 50 of the conical washer 49. As shown in Figure 8 of the drawings, the body portion of the disk 48, when snapped over the washer 49, causes the inner corner of the collar 53 to impinge against the inclined face 50 of the washer 49 to move the end of the pipe 44 into contact with the upper end of the elbow pipe section 47.

As shown in Figure 10 of the drawings, the couplings 28 illustrated in Figures 4 and 5 of the drawings may be applied to any number of curved pipes such as the pipes 54, 55 and 56; providing these pipes, at their contacting end, have cooperating outwardly directed flanges 57 and 58 formed thereon.

It will be apparent from the disclosure herein that the system of piping can be assembled without the use of tools, and can be very readily taken apart whenever it becomes necessary or desirable to clean the various pipes, straight or curved, which constitute a conduit for dispensing beverages or other liquids under low pressure. The inner surface of the system of piping and fittings provide a smooth, continous, full-size bore giving sweeping angles of flow of the liquid extending from a bulk container to a dispensing faucet.

While I have shown the various forms of flexible coupling in detail, it is to be understood that the invention is not to be considered as limited to this specific construction shown in the drawings, nor in any other way except as indicated by the scope of the claims appended hereto.

What I claim is:

1. A union pipe-coupling comprising a pair of tubular shells of rubber or the like, each shell having an inturned annular flange at one end thereof and a cylindrical body portion at its other end to grip a pipe inserted therein, one of said shells having a flange extending at an acute angle inwardly to the axis of said cylindrical body portion, the other of said shells having a flange extending outwardly from said cylindrical body portion, said axially inclined flange being adapted to snap over the last named flange to connect shells together.

2. A union pipe-coupling comprising a pair of tubular shells of rubber or the like, each shell having an inturned annular flange at one end thereof and a cylindrical body portion at its other end to grip a pipe inserted therein, one of said shells having a flange extending at an acute angle inwardly to the axis of said cylindrical body portion, the other of said shells having a flange extending outwardly from said cylindrical body portion, said axially inclined flange being adapted to snap over the last named flange to connect the shells together, each of said shells being bulged outwardly between their opposite ends to form vacuum chambers around the pipes inserted therein.

3. A union pipe-coupling comprising a pair of tubular shells of rubber or the like, each shell having an inturned annular flange at one end thereof and a cylindrical body portion at its other end to grip a pipe inserted therein, one of said shells having a flange extending at an acute angle inwardly to the axis of said cylindrical body portion, the other of said shells having a flange extending outwardly from said cylindrical body portion, said axially inclined flange being adapted to snap over the last named flange to connect shells together, each of said shells being bulged outwardly between their opposite ends to form vacuum chambers around the pipes inserted therein and being provided in their inner surfaces with reinforcing ribs or beads to restore said chambers to normal shape upon removal of pressure therefrom.

4. A union pipe-coupling comprising a pair of tubular shells of rubber or the like, each shell having an inturned annular flange at one end thereof and a cylindrical body portion at its other end to grip a pipe inserted therein, one of said shells having a flange extending at an acute angle inwardly to the axis of said cylindrical body portion, the other of said shells having a flange extending outwardly from said cylindrical body portion, said axially inclined flange being adapted to snap over the last named flange to connect shells together, a frusto-conical metallic washer embedded in the outer flanged end of said other shell, and a metal collar surrounding said washer in contact with its inclined face, said inclined flange being adapted to snap over said collar to force the latter into clamping contact with the inclined surface of said washer.

5. A pipe coupling comprising a tubular shell of rubber or the like having parts of its inner periphery of the same diameter and spaced apart to grip resiliently correspondingly spaced portions of a pipe of slightly larger diameter, said shell between said parts being bulged outwardly to form a vacuum chamber and adapted to be compressed by applying to said pipe and to expand after being applied thereto to increase the frictional contact of said parts with said pipe.

6. A pipe coupling comprising a tubular shell of rubber or the like having parts of its inner periphery of the same diameter and spaced apart to grip resiliently correspondingly spaced portions of a pipe of slightly larger diameter, said shell between said parts being bulged outwardly to form a vacuum chamber for increasing the frictional contact of said parts with said pipe, the bulged part of said shell being provided on its inner surface with means to restore said part to substantially normal shape after being compressed by applying to said pipe.

VALENTINE BEECHER.